Sept. 22, 1959 R. R. ROEDER, JR 2,905,427
MOUNTING DEVICE WITH POSITIVE CLAMPING AND LOCATING
JAWS PROVIDING QUICK RELEASE MEANS
Filed June 18, 1956 4 Sheets-Sheet 1
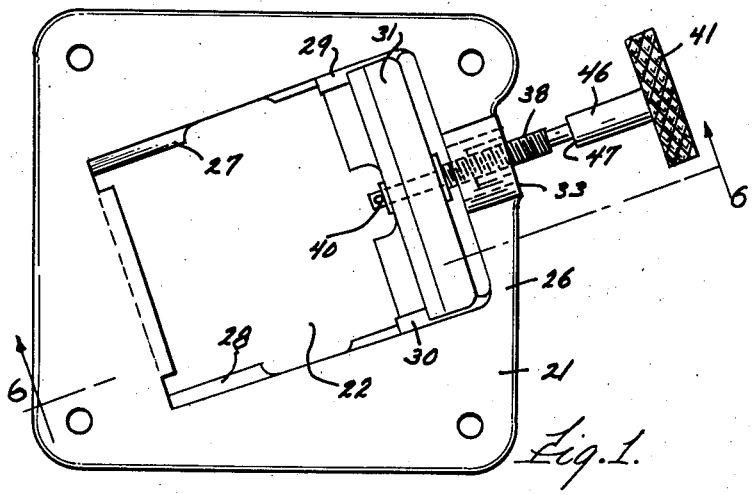
Fig. 1.
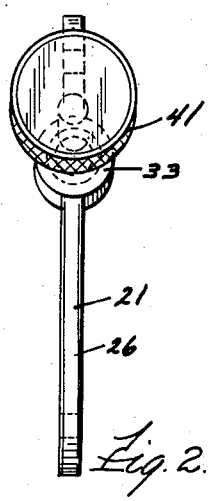
Fig. 2.
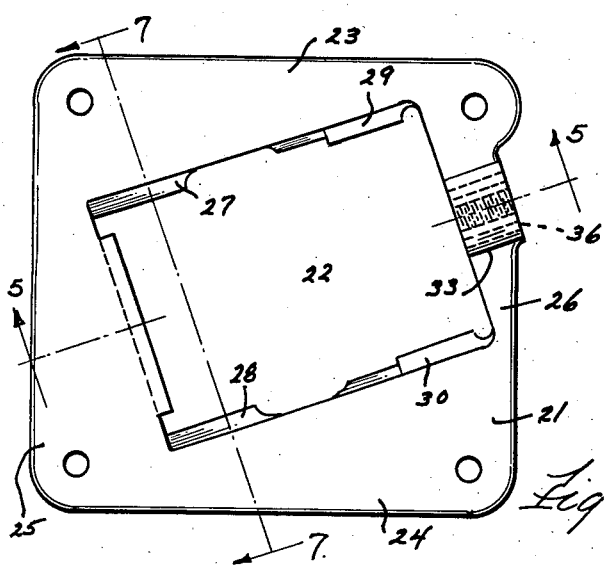
Fig. 3.
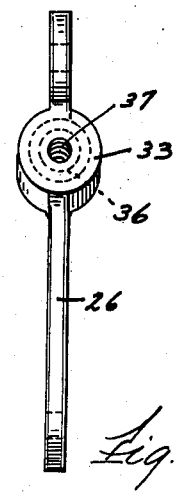
Fig. 4.
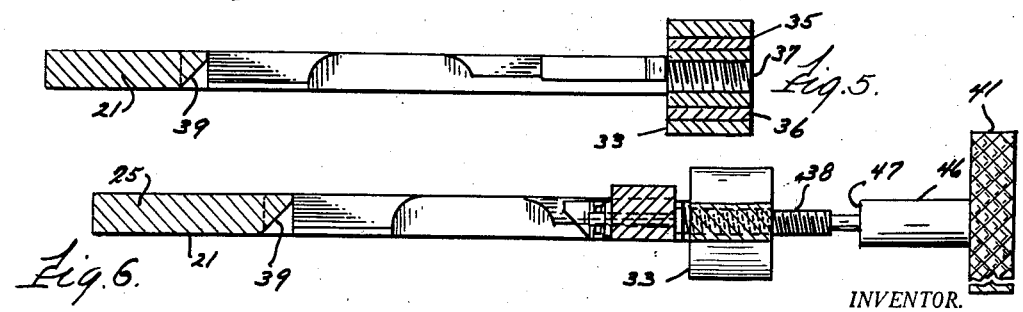
Fig. 5.
Fig. 6.
Fig. 7.
INVENTOR.
RUSSELL R. ROEDER JR.
BY
Joseph B. Lindecker
Attorney.

Sept. 22, 1959                R. R. ROEDER, JR                2,905,427
            MOUNTING DEVICE WITH POSITIVE CLAMPING AND LOCATING
                    JAWS PROVIDING QUICK RELEASE MEANS
Filed June 18, 1956                                    4 Sheets-Sheet 2
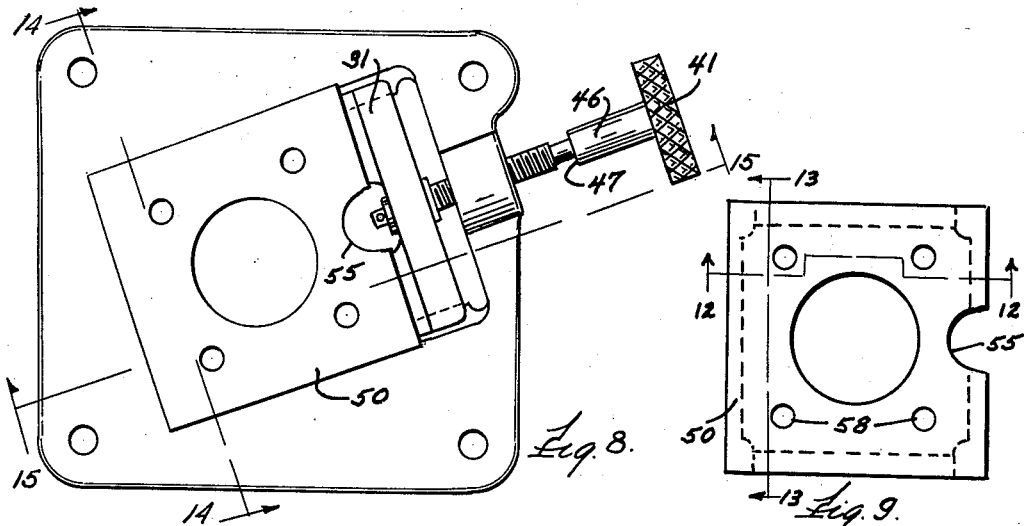
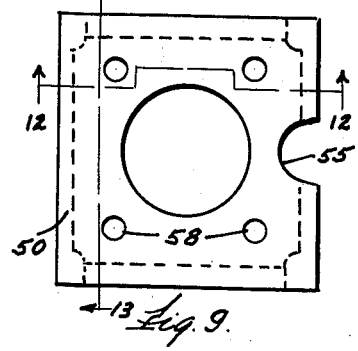
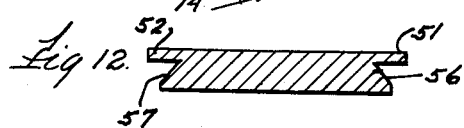
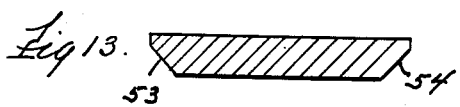
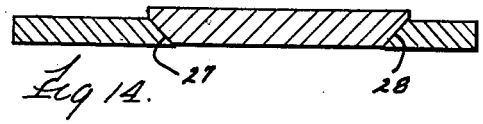
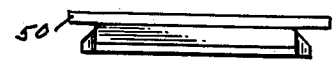
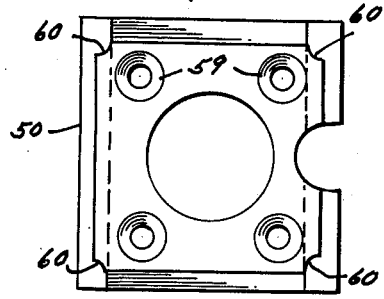
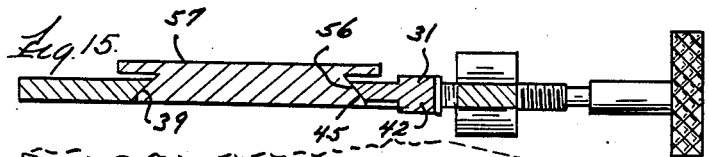
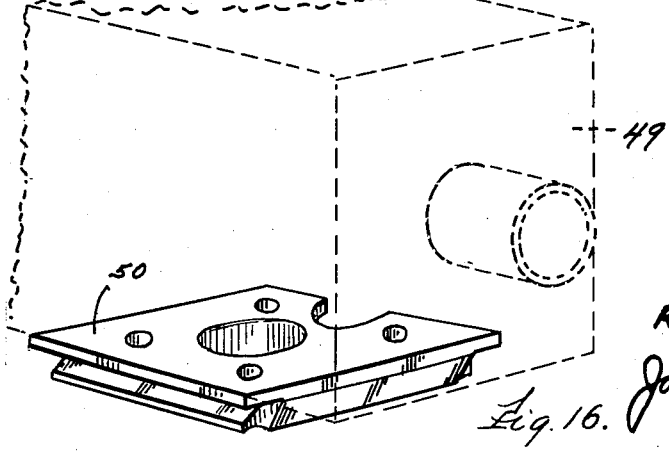
INVENTOR.
RUSSELL R. ROEDER JR.
BY
Joseph B. Lindecker.
Attorney.

Sept. 22, 1959　　　R. R. ROEDER, JR　　　2,905,427
MOUNTING DEVICE WITH POSITIVE CLAMPING AND LOCATING
JAWS PROVIDING QUICK RELEASE MEANS
Filed June 18, 1956　　　　　　　　　　　4 Sheets-Sheet 3
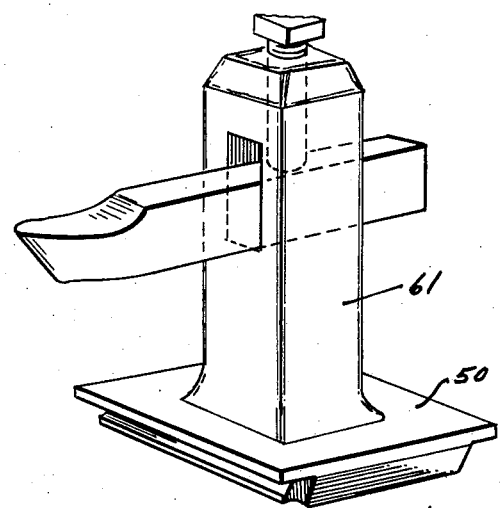
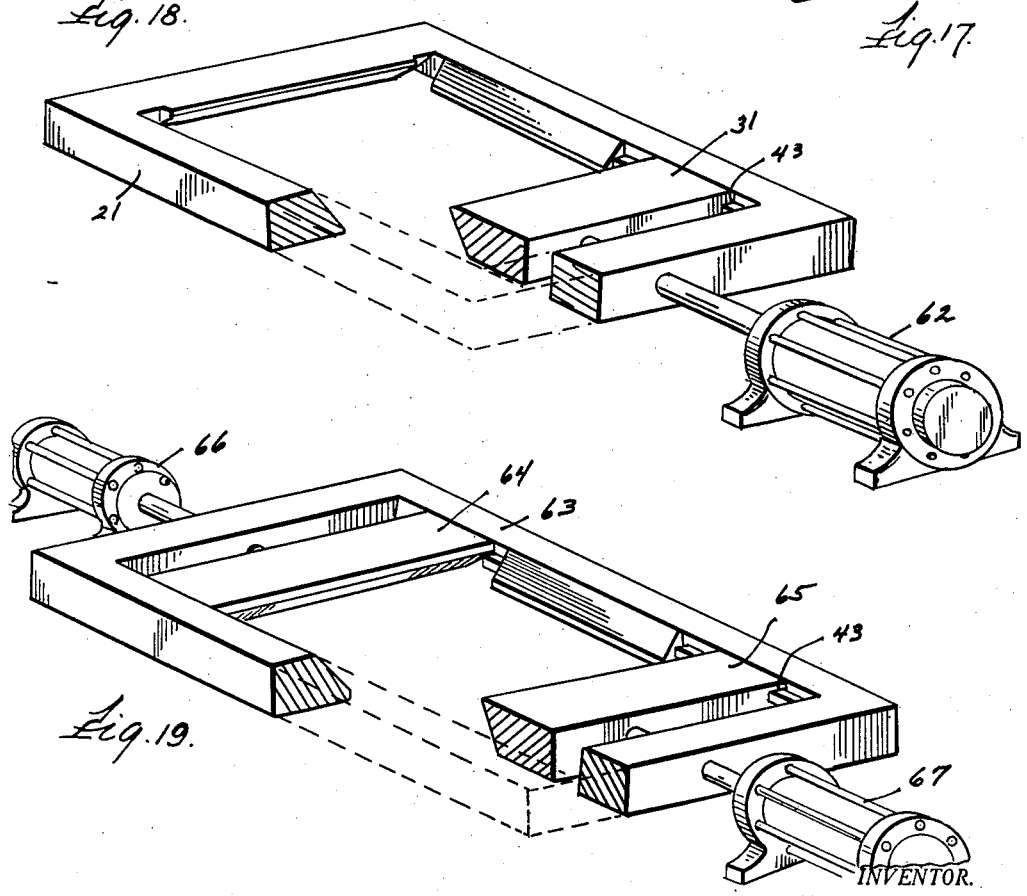
INVENTOR.
RUSSELL R. ROEDER JR.
BY
Joseph B. Lindecker.
Attorney.

INVENTOR.
RUSSELL R. ROEDER JR.
BY
Joseph B. Lindecker
Attorney.

United States Patent Office 2,905,427
Patented Sept. 22, 1959

2,905,427

MOUNTING DEVICE WITH POSITIVE CLAMPING AND LOCATING JAWS PROVIDING QUICK RELEASE MEANS

Russell R. Roeder, Jr., Cincinnati, Ohio, assignor to Huber Industries, Inc., Cincinnati, Ohio, a corporation of Ohio Application June 18, 1956, Serial No. 592,208

9 Claims. (Cl. 248—346)

This invention relates to a mounting device, and more particularly to a mount used in conjunction with articles which must be rapidly clamped in a desired location, quickly removed and subsequently reclamped and relocated in the same position.

Another object of the invention is to provide a device of this character which will clamp in position and constitute a temporary support for the article while it is being moved from one location to another, thereby eliminating any possibility of the article slipping or dropping from the carrier.

Another object of the invention is to provide a novelly designed holder for a lathe tool and the like, which is adapted to positively clamp and quickly release the tool when it is desired to make adjustments of the article being worked upon, or for any other reason.

Another object of importance is to provide a mounting device which is self-centering, self-leveling and positive in the avoidance of lateral motion for use with cameras, aircraft instruments, sights, whether they be for artillery, aircraft, tanks and the like, or wherever else that a quick release mounting with a positive relocation might be desired, and which will withstand vibration without shifting.

A further object is to provide a mounting device for clamping an article and, at the same time, providing means for accurately leveling the same. This is accomplished by employing a mounting having a base member embodying two supporting members with oppositely inclined acting faces of corresponding angularity to receive a work-supporting plate with inclined supporting faces of the same angularity, and means for effecting locating and clamping the work plate by the movement of a clamping jaw slidably mounted upon the base.

A still further object is to provide a mounting device for articles which can be secured to a plate member, the base member of the mounting being provided with clamping means and supporting means embodying inclined surfaces of 45° angularity, so arranged therewith that it will support and clamp any one of a large number of articles varying in size or shape from one another, which have secured thereto a supporting plate with exactly the same inclined walls and dimensions suitable for use with said base.

A still further object is to provide a mounting device for use with any kind of optical instrument whose requirements for location and subsequent relocation with quick removal is needed, together with radar components and the like.

A still further object is to provide a mounting device embodying side angle surfaces and clamping jaws with angular surfaces, the angularity of the side surfaces being substantially 45°, and the planes of which, in the preferred arrangement, are somewhat higher than the planes of the locking surfaces of the clamping jaws so as to be assured of positive pressure on the side angle surfaces before bottoming occurs between the actuated and fixed clamping members employed herewith.

Other objects will appear from the following description, the claims appended thereto, and from the annexed drawing, in which like reference characters designate like parts throughout the several views, and wherein:

Figure 1 is a top plan view of a mounting device in accordance with the present invention, the article attachment plate being removed;

Figure 2 is an end elevation of the mounting shown in Figure 1;

Figure 3 is a top plan view of the base member of the mounting shown in Figures 1 and 2;

Figure 4 is an end elevation of the base member shown in Figure 3;

Figure 5 is a sectional view taken on line 5—5 of Figure 3;

Figure 6 is a sectional view taken on line 6—6 of Figure 1;

Figure 7 is a sectional view taken on line 7—7 of Figure 3;

Figure 8 is a top plan view of a mounting device in accordance with the present invention, the article-supporting plate clamped in the base member thereof;

Figure 9 is a top plan view of the article-supporting plate;

Figure 10 is an end elevation of the plate shown in Figure 9;

Figure 11 is a bottom plan view of the plate shown in Figures 9 and 10;

Figure 12 is a sectional view taken on line 12—12 of Figure 9;

Figure 13 is a sectional view taken on line 13—13 of Figure 9;

Figure 14 is a sectional view taken on line 14—14 of Figure 8;

Figure 15 is a sectional view taken on line 15—15 of Figure 8;

Figure 16 is a perspective view of the plate shown in Figures 9, 10 and 11, a camera being illustrated in dotted lines;

Figure 17 is a perspective view of a lathe tool mounted upon a plate, as shown in Figure 9;

Figure 18 is a perspective view of the base member of the mounting device illustrating a modified means for operating the movable jaw of said device;

Figure 19 is a perspective view of a modified form of base member of the mounting device, two piston-operated movable jaws being embodied herein;

Figure 20:
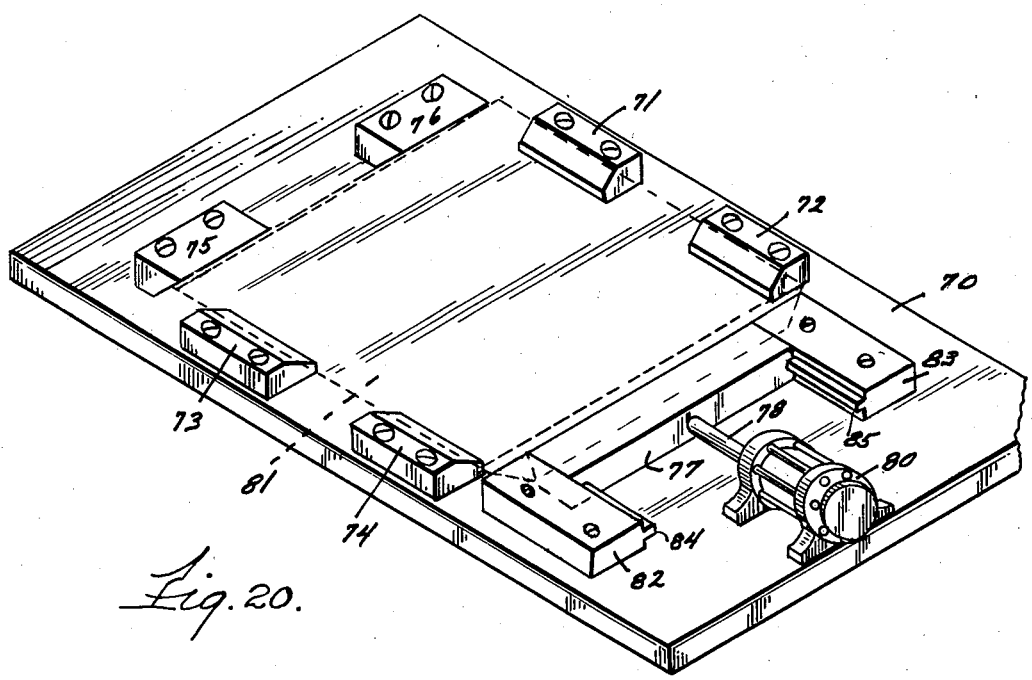
Figure 20 is a perspective view of a platform with individual supporting and clamping means rigidly secured thereon, and a movable jaw assembled with piston operating means, illustrating a modified type equipment which can be used with the same novel basic principle disclosed in the above objects.

Referring by characters to the drawings, the mounting device has a base 21 made of a single piece of suitable material, preferably a lightweight metal. The base 21 provided is rectangular in shape with an open midportion, as shown at 22, said opening being of uniform width throughout. In other words, the base may be described as a rectangular frame with side sections 23 and 24, a rear end section 25, and a head end section 26. The inner side surfaces 27 and 28 of the opening 22 are set at 45 degrees to the top surface of the base 21, as best shown in Figure 14; each of the side sections 23 and 24 adjacent the head end section 26 also provided with short outstanding longitudinal slide rails 29 and 30. This is done for the purpose of supporting a movable jaw 31, which will be described below.

The end section 25 is provided with an inner surface 39 beveled downwardly and rearwardly at 45° to the bottom surface of the base 21, as best shown in Figures 5, 6 and 7. The head end section 26 is provided with an outstanding boss portion 33 rising from the upper and lower surfaces thereof. Said boss 33 is provided with an aperture 35 in which is inserted a self-locking member 36 having a screw-threaded aperture 37 for the reception of a corresponding threaded spindle 38, the rear end of which spindle is provided with the movable jaw 31 secured by a locking pin 40. The forward end of said spindle 38 is provided with an actuating wheel 41.

Disposed within the opening 22 is the movable and/or slidable jaw 31, best illustrated in Figures 1, 8 and 15; said jaw 31 having a thick body portion 42 embodying at each end a horizontal groove 43 for fitting over slide rails 29 and 30 to provide a sliding action thereon. The rear side portion of said movable jaw 31 is provided with a clamping surface 45 beveled downwardly and rearwardly at 45° with the top surface thereof, clearly shown in Figure 15.

The movable and/or slidable jaw 31 may be moved longitudinally within the open portion 22 of base 21 to any desired position with respect to slide rails 29 and 30. To eliminate the possibility of having the movable jaw 31 drop out through the open space 22, I have provided a hub portion 46 upon the spindle 38 between the threaded portion thereof and the actuating wheel 41. The rear end portion 47 of the hub 46 contacts the outer face of the boss portion 33 and limits the extent of the movement of the threaded spindle 38 rearwardly so that the rails 29 and 30 will not become completely exposed outside of grooves 43. The movable and/or slidable jaw 31 itself is retained on the rails 29 and 30 when moved forwardly as the jaw 31 comes into contact with the inner face of the head end section 26 when moved forwardly as far as possible.

As the spindle 38 is in threaded engagement with the boss portion 33 of head end section 26 and has its inner end operably connected to the movable jaw 31, the rotation of the spindle 38 in one direction moves the jaw 31 rearwardly toward rear end section 25 for clamping a work-supporting plate 50 therebetween. To release the plate 50 clamped between the movable jaw 31 and rear end portion 25, the spindle is rotated in an opposite direction.

The work-supporting plate 50, as best shown by Figures 9, 10 and 11, is rectangular in shape, having a forward edge portion 51, a rear edge portion 52, and side edge portions 53 and 54. The forward edge portion 51 is provided at its midsection with a semicircular opening 55, the remaining portion thereof being formed with an interiorly extending dovetail clamping recess 56. The rear edge portion 52 of the plate 50 is formed with a dovetail recess 57. The side edges 53 and 54 of the plate 50 are beveled downwardly and inwardly at 45° with the bottom surface thereof. It should be mentioned that said side edge portions 53 and 54 fit into surface contact with the inner side surfaces 27 and 28 of base 21 when said plate is placed into the desired position upon said plate; said dovetail recess 57 is in alignment with said bevel surface 39 of base 21 when placed thereon; and said dovetail recess 56 is in alignment with said clamping surface 45 of said movable jaw 31. The planes of said side bevel surfaces 27, 28, 53 and 54 are somewhat higher than the planes of the locking surfaces in said dovetail surfaces 56 and 57 so that when the rear edge surface 39 of base 21 and the rear edge surface 45 of the movable jaw 31 are moved into engagement with said dovetail surfaces 56 and 57 of said plate, a positive pressure is assured upon the side bevel surfaces 27 and 28 before bottoming occurs; as clearly shown by Figure 15. The plate 50 is provided with a plurality of holes 58 with counter-bored surfaces 59, as clearly shown by Figures 9 and 11, said holes desired for the passage of bolts, screws, etc., to secure a camera, a sight, and the like, to plate 50; a camera 49 being shown in dotted lines upon the plate 50 by Figure 16. Said plate 50 has each of its four corners notched; thereby removing a portion of the dovetail recess and providing clearance for quick engagement of said plate 50 with the base 21. The notches are designated by numeral 60, clearly shown by Figure 11.

In the practical use of the mounting device just described, a camera 49, or the like, is applied and attached to the supporting plate 50. The supporting plate is then positioned in contact with the base 21 with semicircular opening 55 in proximity of the movable jaw 31, the beveled surfaces 53 and 54 of the plate contacting the beveled surfaces 27 and 28 of the base; the spindle being turned by actuation of wheel 41 causing the movable jaw 31 to enter the dovetail recess 56 of the plate, said action moving the plate rearwardly, thereby forcing the rear bevel surface edge portion 39 of the base 21 into the dovetail recess 57 of the plate. As the surface 39 contacts recess 57 and the surface 45 contacts recess 56, the angularity of said surfaces forces the plate 50 to move downwardly, said plate 50 moving downwardly until the beveled side surfaces 27 and 28 contact side surfaces 53 and 54 and said surfaces become properly located and into intimate contact therewith. Said plate will shift laterally until all surfaces are in perfect engagement, then further movement of jaw 31 will cause a forceful clamping action to take place between the surfaces of the jaws and the dovetail recesses incorporated in plate 50 with the base 21. It is clearly seen that the plate 50 is self-centering, self-leveling and positive in the avoidance of lateral motion due to the 45° angle supporting and clamping surfaces. The 45° angle is the preferred angle because if other angles were used and force applied in one direction, there would be a jamming action rather than a wedging action, and in which case the parts might have to be beaten apart, and, in the other direction, the action of centering and locating would not be as rapid as in a matching set of 45° angles. Said 45° angles not only cause rapid centering and leveling, but permit quick releasing of the clamping parts, which is extremely important and especially in aircraft operation. Quick removal is always needed with articles together with radar components and the like.

The quick releasing referred to above shows a novel type of disconnecting means for use as a remotely controlled clamping device for the holding of bombs, missiles and other armament. Further, the use of the grasping of disposable gasoline tanks on aircraft where they could be assured of perfect clamping and location while the device is to be retained, and, at the same time, by the actuation of a hydraulic cylinder or other remote arrangement, they could be readily disconnected from the aircraft, etc., and be disposed of by being dropped therefrom.

In Figures 17, 18, 19 and 20, I have shown modifications wherein the supporting plate and base member may be changed in configuration and number of parts still perform in the above stated novel manner.

In Figure 17, a tool holder 61 is secured to the work-supporting plate 50; a tool holder of this type can be quickly applied, clamped and removed from a turning machine or the like, as desired.

In Figure 18, I have shown a modification wherein the base 21 and movable jaw 31 are substantially the same as described above; however, the movable jaw 31 is shown here to be operated by a piston within a hydraulic and/or air cylinder 62. This type unit can be used where greater clamping and/or holding power is needed, especially by the use of remote control devices; this type is adaptable for aircraft, vessels, and the like.

In Figure 19, I have shown a modification where a base 63 is employed, said base including a frame with four rigid side and end members and in combination with two movable jaws 64 and 65, each of said jaws 64 and 65 being operated by pistons within hydraulic and/or air cylinders 66 and 67 respectively. It is not absolutely necessary to move both jaws, one or the other, or both, may be moved as desired to effect the original locking, leveling, clamping and aligning. In some cases, where an instrument is secured to a supporting plate 50, it might be desirable to move both jaws, which can be done, to achieve a certain specific vernier-type of location. Movement of both jaws will give a quicker discharge, where it may be desired to dispose of something without any hindrance and in split second timing. By having an article clamped on 45° angle surfaces and moving two locking jaws at the same time, then it is certain that the article will be quickly released.

In Figure 20, I have shown a modification where a large area, a platform 70, or a boat deck, is shown instead of a base 21 with an opening 22, as shown in a majority of the other figures. Segment blocks, in combination with a movable jaw 77, are shown arranged in a rectangular formation. Four 45° angle surface-supporting blocks 71, 72, 73 and 74 are bolted, or screwed, to the platform 70 to form the side-supporting and locating surfaces. Two blocks 75 and 76, with 45° angle undercut locking surfaces, are bolted, or screwed, to the platform to form the stationary end clamping members. Two blocks 82 and 83 are provided with rails 84 and 85 and secured to platform 70 for guiding said jaw 77. The movable jaw 77 is provided with grooves to receive said rails 84 and 85; said jaw 77 having under cut clamping surface and being shown attached to a piston rod 78 connected to a piston within a hydraulic cylinder 80. The work-supporting plate 81 is shown dotted and is constructed with matching 45° angle side surfaces and the usual dovetail recesses, as shown in the other figures. Large engines, auxiliary aircraft parts and other equipment can be secured to the supporting plate 81, said plate 81 positioned upon the side blocks and clamped within the end blocks to said platform 70 by moving the jaws 77 into contact with the dovetail recess necessary and always found in the forward end of the supporting plate; this action forcing the plate 81 into contact with rear blocks 75 and 76, all of which causes the plate 81 to be drawn downwardly upon side blocks 71, 72, 73 and 74. This modification is adaptable to mount large equipment and engines which must be quickly released and removed from their locked in place location.

The invention, generally stated, comprises the method and means embodying a frame and/or platform embodying side leveling, positioning and supporting surfaces of 45° angularity, end members with oppositely inclined jaws of corresponding angularity, a work-supporting plate provided with 45° angle side surfaces and end dovetail recesses so arranged as to be positioned upon the frame and/or platform, and means for effecting relative movement of said jaws toward and from each other in a rectilinear path, the parts being so constructed and arranged that when a jaw is moved into contact with the work-supporting plate, the clamping jaws being on diametrically opposite sides of said plate, they are relatively actuated to cause the acting faces of the jaws to apply effective downward force to the dovetail surfaces of the supporting plate, thus insuring equality of stress and symmetry of application on the opposite sides of the plate and the frame. This mounting device produces rapid clamping action with means for quick release and positive relocation of the article mounted.

Although the foregoing description is necessarily of a detailed character, in order to define the structure, function and advantages of the invention, it is to be understood that the specific terminology is not intended to be restrictive or confining and that various rearrangements of parts and alternate combinations of elements may be resorted to without departing from the scope or spirit of the invention as herein claimed.

I claim:

1. A mount for the purpose described, comprising; a mounting base and an object-supporting plate to be accurately arranged and clamped to said base; said base embodying an open mid-portion of uniform width, said base further provided with a fixed jaw at one end and a movable jaw at the opposite end thereof, a fixed end section at said opposite end, and two side sections integrally connected with said fixed jaw and said fixed section, the side sections having fixed slide rails, the movable jaw being located on the slide rails, each of said jaws embodying downwardly and outwardly clamping surfaces of corresponding angularity, each of said side sections embodying downwardly and inwardly supporting faces of corresponding angularity, said object-supporting plate embodying two downwardly and inwardly supporting faces on opposite side edges thereof and of corresponding angularity, said plate further provided with recesses on opposite ends thereof, each recess embodying a downwardly and outwardly clamping surface therein, and means for effecting relative horizontal movement of said jaws toward and away from each other to effect a locating force between the supporting faces of said base and said plate and a wedging action between said clamping surfaces of said jaws and said recesses.

2. A mount according to claim 1 wherein said clamping surfaces and supporting faces embodied with said base and said plate are constructed at 45° angle with the horizontal plane of said base.

3. A mount for the purpose described, comprising; a mounting base frame and a rectangular-shaped object-supporting plate to be accurately located and clamped upon said base frame; said base frame embodying two jaws with downwardly and outwardly inclined acting surfaces, a fixed clamping jaw at one end of said frame and a movable clamping jaw assembled at the opposite end of said frame so that said jaws are opposite each other, a fixed end section at said opposite end of said frame, said base frame also embodying two downwardly and inwardly inclined supporting faces opposite each other on opposite sides of the frame and integrally connected with said fixed jaw and said fixed end section, said rectangular-shaped object-supporting plate embodying two downwardly and inwardly inclined side-supporting faces opposite each other along with two recesses opposite each other located on the remaining two sides of the plate, said recesses embodying downwardly and outwardly inclined surfaces therein the faces of said plate and said frame being of the same angularity; the bottom of said two recesses being located a slight distance above the top surface of said base frame and the top surface of said jaws being located substantially parallel with the top surface of said base frame when assembled together; and means for effecting relative movement of said jaws toward and from each other to exert a vertical locating force between said faces and a clamping force between said jaws and said recesses.

4. A mount for the purpose described, comprising; a mounting base frame for attachment to a suitable base and a rectangular-shaped object-supporting plate to be accurately located and clamped upon said base frame; said base frame embodying an open mid-portion of uniform width, said base frame further provided with a fixed and a movable jaw, a fixed end section, and two side sections, the side sections having fixed side rails juxtaposed said open mid-portion, the movable jaw being located on said slide rails, each of said jaws embodying downwardly and outwardly clamping surfaces of the same angularity, each of said side sections embodying downwardly and inwardly supporting faces of the same angularity and juxtaposed said open mid-portion; means for effecting horizontal movement of said movable jaw; said object-supporting plate embodying two downwardly and inwardly supporting faces on opposite side edges thereof, said plate further provided with recesses on opposite ends thereof; said supporting surfaces of said plate to rest upon the supporting surfaces of said frame; said recesses of said plate adapted to receive the jaws of said frame; the movement of said movable jaw into contact with one of the recesses of said plate thereby moving said plate into clamping engagement with the second of said jaws and resulting in an acting force between said supporting faces, whereby said object-supporting plate is clamped to said base frame in a manner insuring equality of stress and symmetry of application on the opposite sides of said plate and said frame.

5. A mount for the purpose described, comprising: a mounting base frame for attachment to a suitable base and an object-supporting plate of rectangular configuration to be accurately located and clamped upon said base frame; said base frame comprising side sections with two oppositely inclined supporting faces of 45° angularity; said base further embodying jaws with oppositely inclined clamping surfaces, one of said jaws being integral with an end portion of said base frame and one of said jaws being movable; means for effecting horizontal movement of said movable jaw; said object-supporting plate comprising side sections with two oppositely inclined supporting faces of 45° angularity; said supporting plate also embodying end sections with two oppositely inclined recesses formed therein; said 45° angle supporting surfaces of said plate to rest upon the 45° angle supporting surfaces of said frame; said recesses of said plate adapted to receive the jaws of said frame when moved therein; the bottom of said recesses being located a slight distance above the top surface of said movable head when assembled together, the movement of said movable jaw into contact with one of the recesses of said plate thereby moving said plate into clamping engagement with the second of said jaws and resulting in a vertical acting force between said supporting faces, whereby said object-supporting plate is clamped to said base frame in a manner insuring equality of stress and symmetry of application on the opposite sides of said plate and said frame.

6. A mount for the purpose described, comprising: a base frame and an object-supporting plate of rectangular configuration; the base frame comprising a fixed head, a pair of spaced side members extending therefrom embodying supporting faces which are inclined downwardly and inwardly therefrom, and an end member connecting the ends of said side members; said side members embodying slide rails, a movable head slidably mounted with said slide rails; said end member and said movable member being undercut and embodying clamping faces which are inclined downwardly and outwardly with respect to the top surfaces thereof; an actuating member extending through said fixed head; the supporting plate of rectangular configuration comprising a top surface, a bottom surface, and four sides, two of said opposite sides embodying supporting faces inclined downwardly and inwardly, the other two of said sides embodying recesses with inclined surfaces therein; and means for connecting one end of said actuating member to said movable head, whereby said movable head may be moved towards and from the fixed head for effecting a locating force between said supporting faces and a clamping action between said heads and said recesses.

7. A mount for the purpose described, comprising: a base frame of substantially rectangular shape with an open mid portion and an object-supporting plate of substantially rectangular shape; the base frame comprising a fixed head, a pair of spaced side members extending therefrom embodying supporting faces which are inclined downwardly and inwardly therefrom, and an end member connecting the ends of said side members; said side members embodying slide rails, a movable head slidably mounted with said slide rails; said end member and said movable member being undercut and embodying clamping faces which are inclined downwardly and outwardly with respect to the top surfaces thereof; a screw extending through said fixed head; the supporting plate comprising a top surface, a bottom surface, and four sides, two of said opposite sides embodying supporting faces inclined downwardly and inwardly for assembly with said downwardly and inwardly inclined surfaces on said side members, the other two opposite sides embodying recesses therein with inclined surfaces extending downwardly and inwardly; and means for rotatably connecting the end of the screw to the movable head, whereby said movable head may be moved toward and from the fixed head for effecting a locating force between said supporting faces and a clamping action between said end member and said movable head with said recesses.

8. The mount as claimed in claim 7 wherein said clamping faces and supporting surfaces embodied with said base and said inclined surfaces embodied with the sides and in said recesses of said plate are constructed at 45° angle with the horizontal plane passing through said base frame.

9. A mount for the purpose described, comprising: a base frame with an open mid-portion and an object-supporting plate of rectangular configuration; the base frame comprising a fixed head, a pair of spaced side members extending therefrom embodying supporting faces thereon which are inclined downwardly and inwardly therefrom at 45°, and an end member connecting the ends of said side members; a movable head slidably mounted upon slide rails embodied with said side members; said end member and said movable member being undercut and embodying clamping faces which are inclined downwardly and outwardly therefrom at 45°; a screw extending through said fixed head; the supporting plate comprising a top surface, a bottom surface, and four sides, two of said opposite sides embodying faces inclined downwardly and inwardly therefrom at 45°, the remaining two opposite sides embodying undercut recesses with inclined surfaces inclined downwardly and outwardly at 45°; and means for rotatably connecting the end of said screw to the movable head; the bottom of said undercut recesses being located a slight distance above the top surface of said movable head when assembled together, whereby said movable head may be moved toward and from the fixed head for effecting a vertical locating force between said supporting faces and a clamping action between said heads and said recesses.

References Cited in the file of this patent

UNITED STATES PATENTS

| | | |
|---|---|---|
| 1,490,608 | Gilmour | Apr. 15, 1924 |
| 1,604,193 | Pieper | Oct. 25, 1932 |
| 1,884,370 | Swanson | Oct. 25, 1932 |
| 2,351,386 | Zucker | June 13, 1944 |
| 2,536,170 | Guest | Jan. 2, 1951 |
| 2,615,664 | Reeves | Oct. 28, 1952 |